US006568690B1

(12) United States Patent
Tognali et al.

(10) Patent No.: US 6,568,690 B1
(45) Date of Patent: May 27, 2003

(54) SEALING DEVICE FOR A FLAT-BRAID CONNECTION

(75) Inventors: Stéphane Tognali, Villiers sur Marne (FR); Jérôme Vandele, Fontenay sous Bois (FR)

(73) Assignee: Cables Pirelli, Saint Maurice (FR)

( * ) Notice: Subject to any disclaimer, the term of this patent is extended or adjusted under 35 U.S.C. 154(b) by 0 days.

(21) Appl. No.: 09/520,783

(22) Filed: Mar. 8, 2000

(30) Foreign Application Priority Data

Mar. 9, 1999 (FR) ........................................... 99 02909

(51) Int. Cl.[7] ................................................ F16L 17/00

(52) U.S. Cl. ..................... 277/602; 277/607; 174/74 R; 174/75 B

(58) Field of Search ............................ 174/74 R, 75 B, 174/77 R; 277/603, 607, 626, 627

(56) References Cited

U.S. PATENT DOCUMENTS 2,906,810 A * 9/1959 D'Ascoli .................. 174/74 R
3,243,211 A * 3/1966 Wetmore
4,292,099 A * 9/1981 Dinger

* cited by examiner

*Primary Examiner*—Anthony Knight
*Assistant Examiner*—Enoch E Peavey
(74) *Attorney, Agent, or Firm*—Finnegan, Henderson, Farabow, Garrett & Dunner, L.L.P.

(57) ABSTRACT

A flat conductor made in the form of a tubular conductor is sealed at an end connection using a rigid core of convex external surface. The rigid core is slipped into an end part of the tubular flat conductor. A protective sleeve made of a cold-recoverable material seals the conductor in compression between the core and the sleeve.

8 Claims, 2 Drawing Sheets

SEALING DEVICE FOR A FLAT-BRAID CONNECTION

BACKGROUND OF THE INVENTION

The subject of the present invention is the sealing of an end connection of a flat conductor made in particular in the form of a tubular flat braid.

Electrical conductors are frequently used which have a flat general shape and, in particular, are produced in the form of a wire braid made of an electrically conducting material, initially being in a tubular form and then being flattened, so as to assume a flat shape, and covered with an insulating protective sheath.

Flat braids of this type are used in particular for setting the screens of a high-voltage power-cable joint at the same potential, particularly for earthing them. Since such joints have to be perfectly insulated and sealed, it is also necessary to provide means for sealing the connection of the end of these flat-shaped conductors.

Thus, three flat braids are generally used, these having to be connected to an earth cable. In order to seal the connection, the ends of the three flat braids are placed one above another, the assembly is surrounded by an insulating material of the mastic type, which will fill the interstices of the ends of the three flat braids, and the entire assembly is gripped by means of a cold-recoverable sleeve or sheath which will also grip the earth cable made in the form of a round conductor.

Such a known construction has many drawbacks. This is because the sealing mastic carries the risk of creeping with variations in temperature, resulting in sealing defects. In addition, it is found in practice that, despite the use of the sealing mastic, the recoverable sleeve or sheath which grips the assembly cannot suitably come into contact with the mastic because of the flat shape of the braids, so that this may result in unprotected regions inside the sheath after recovery.

The object of the present invention is to eliminate these drawbacks and to considerably improve the sealing of an end connection of a flat conductor, particularly one made in the form of a tubular flat braid.

SUMMARY OF THE INVENTION

The sealing device for an end connection of a flat conductor, particularly one in the form of a tubular flat braid according to the invention, comprises a sleeve for sealing and protecting the connection, the sleeve being made of a cold-recoverable material which will grip the connection, and a rigid core, of convex outer surface, which is slipped into the end of the tubular flat braid. The assembly is gripped by the protective sealing sleeve.

The tubular flat braid or flat conductor is preferably covered with an insulating protective sheath which is capable of deforming during insertion of the rigid core.

The rigid core may advantageously have a cylindrical external shape. It may be made in the form of an at least partially hollow insert, for example in the form of a tube. The rigid core may also be a solid element such as a bar.

In order to make it easier to insert the rigid core, its end may be tapered or rounded.

The sealing device according to the present invention may be used to seal any end connection of a flat conductor.

One particularly advantageous application of the invention makes it possible to produce a sealing glove having one or more fingers, for the connection of several earth braids to an earth cable of a device for making the screens of a high-voltage power-cable joint an equipotential surface.

BRIEF DESCRIPTION OF THE DRAWINGS

The invention will be more clearly understood upon studying a few embodiments described in a more detailed manner and illustrated by the appended drawings, in which.

DETAILED DESCRIPTION OF THE PREFERRED EMBODIMENTS

Figure 1:
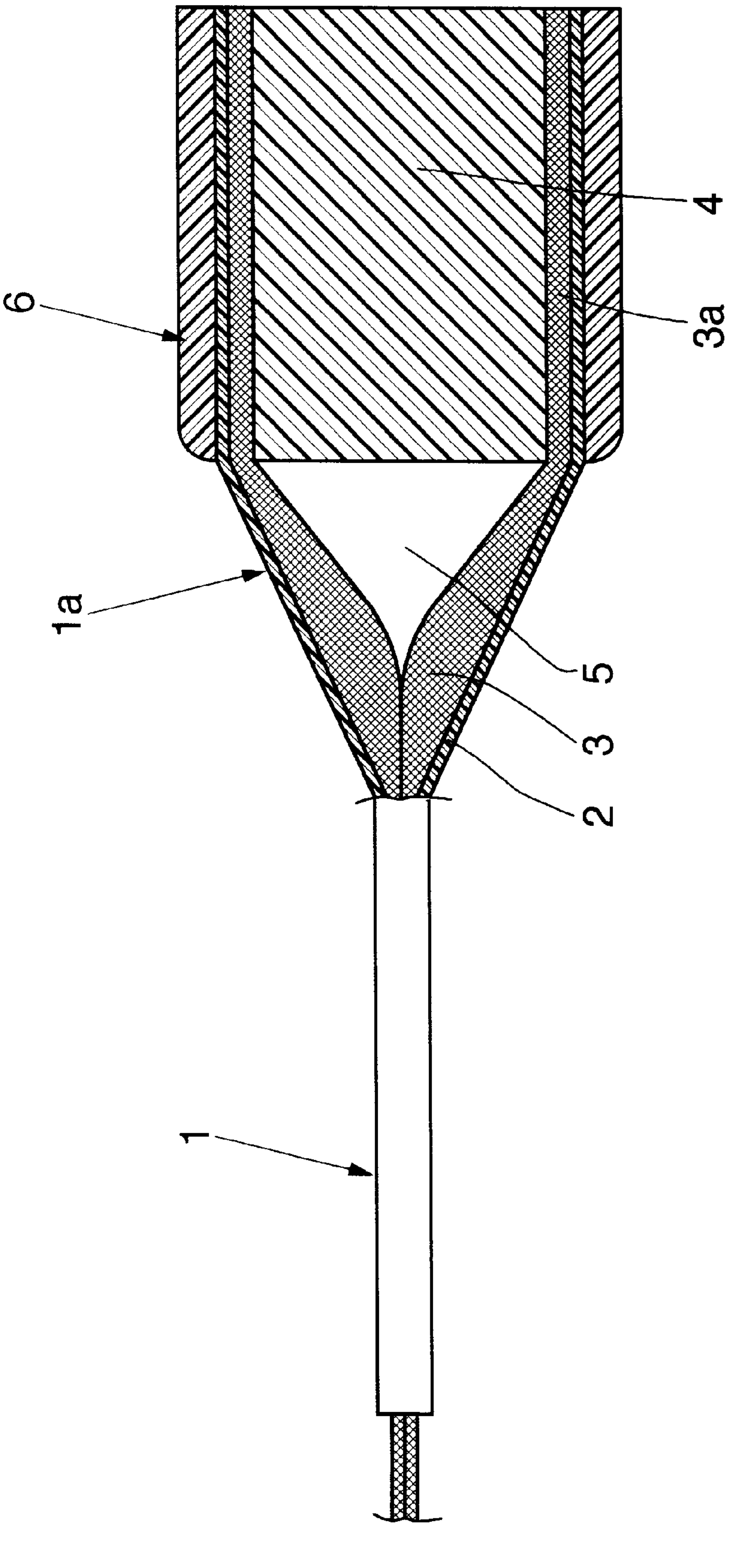
FIG. 1 is a schematic view, in partial cross section, showing the principle of a sealing device according to the invention.

As illustrated in FIG. 1, the sealing device of the invention is tailored to a flat conductor made in the form of a tubular braid 1, the end 1*a* of which has been shown schematically in cross section. The tubular braid is covered with an insulating sheath 2 generally made of a synthetic material having a degree of elasticity, which allows it to deform as will be seen later. The braid itself consists of electrically conducting wires, for example copper wires, which have been braided into a tubular shape and then flattened so as to assume the flat shape visible in FIG. 1.

A rigid core 4, which in the example illustrated in FIG. 1 has a cylindrical general shape of circular cross section, is made of a rigid synthetic material constituting a solid insert. This core 4 has been slipped into the end 1*a* of that part 3 of the tubular flat braid which will surround, as shown at 3*a*, the periphery of the core 4. There is an empty space 5 between the core 4 and the part 3 of the flat-shaped braid, this space 5 lying in the region where the braid goes from the flat shape to the cylindrical shape 3*a*.

The assembly is then sealed by the pressure exerted by a protective sealing sleeve 6 made of a cold-recoverable material having a diameter suitable for exerting this sealing pressure on the braid in its cylindrical part 3*a* covered with the protective sheath 2, the rigid core 4 providing resistance to the compression.

It will be understood that the core 4 can also be made in the form of a hollow tube as long as the strength of the tube is sufficient to withstand the pressure exerted by the recoverable sleeve 6. The core 4 may also be made of metal or any other material. In addition, it is not essential for the core 4 to have a cylindrical external surface. This surface need only be generally convex, so as to ensure good sealing contact during recovery of the protective sealing sleeve 6. In order to make it easier to insert the core 4, the end of the latter may be tapered or rounded, thus at least partly occupying the space 5.

Figure 2:
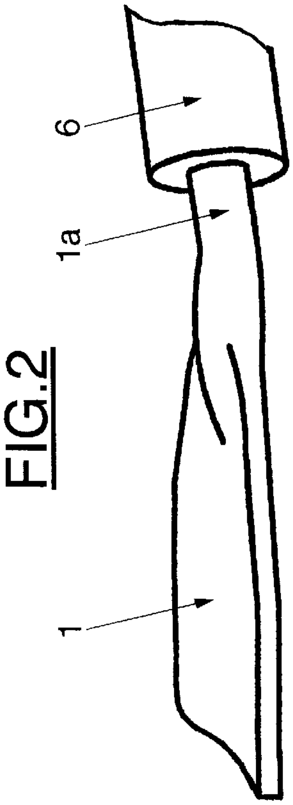
FIG. 2 shows, in a partial external view, a sealing device for a single conductor according to the invention.

As may be seen in FIG. 2, a conductor, in the form of a tubular flat braid 1 covered with an insulating protective sheath, goes from the flat shape to an approximately cylindrical shape 1*a* by virtue of the insertion of a rigid core (not visible in FIG. 2), the assembly being gripped by a sleeve 6 which provides sealing and protection.

Figure 3:
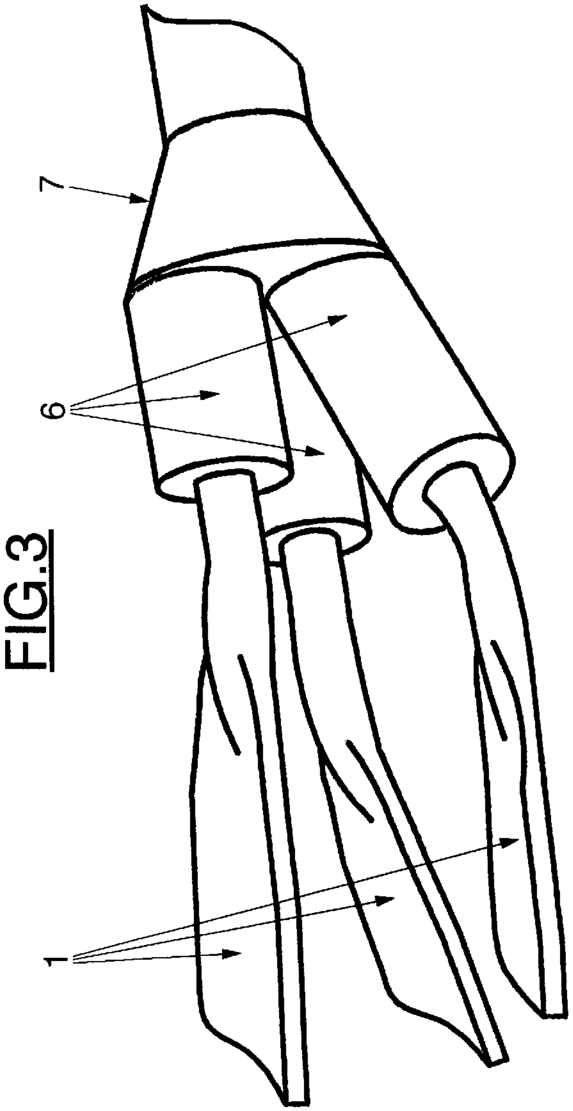
FIG. 3 illustrates, also as an external view, the sealing of a three-finger glove.

In the variant in FIG. 3, three flat conductors 1 are connected by means of a sealing device according to the invention made in the form of a glove 7 having three fingers

6, the assembly being made of a cold-recoverable material which seals and protects the connection.

The present invention thus makes it possible to obtain, in a simple manner, excellent sealing of the end connection of a tubular flat conductor and, in particular, of a conductor in the form of a flat braid.

What is claimed is:

1. A sealing device, comprising:

a tubular flat conductor having an end connection;

a sleeve for sealing and protecting the end connection, said sleeve made of a cold-recoverable material gripping the end connection; and a rigid core of convex external surface slipped into an end part of said tubular flat conductor surrounding said core.

2. The sealing device of claim 1, wherein said flat braid is covered with an insulating protective sheath.

3. The sealing device of claim 1, wherein said rigid core has a cylindrical external shape.

4. The sealing device of claim 1, wherein the rigid core comprises an at least partially hollow insert.

5. The sealing device of claim 1, wherein the rigid core is a solid bar.

6. The sealing device of claim 5, wherein the end of the rigid core is tapered or rounded so as to make it easier to insert it into the tubular flat braid.

7. Use of a sealing device according to claim 1 to produce a multi-fingered sealing glove for the connection of several earth braids to an earth cable of a device for making the screens of a power-cable joint an equipotential surface.

8. The sealing device of claim 2, wherein said rigid core has a cylindrical external shape.

* * * * *